United States Patent
Nonoyama et al.

(10) Patent No.: US 9,758,187 B2
(45) Date of Patent: Sep. 12, 2017

(54) STEERING WHEEL WITH ACCOMMODATION CONCAVE PORTIONS FOR HEATER UNIT CONNECTION PARTS

(71) Applicant: TOYODA GOSEI CO., LTD., Kiyosu-shi, Aichi-ken (JP)

(72) Inventors: Yoshinori Nonoyama, Kiyosu (JP); Masakazu Asano, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/590,084

(22) Filed: Jan. 6, 2015

(65) Prior Publication Data

US 2015/0197272 A1  Jul. 16, 2015

(30) Foreign Application Priority Data

Jan. 10, 2014  (JP) ................. 2014-003404

(51) Int. Cl.
*B62D 1/06*  (2006.01)
*H05B 3/36*  (2006.01)
*H05B 3/34*  (2006.01)

(52) U.S. Cl.
CPC .............. *B62D 1/065* (2013.01); *H05B 3/34* (2013.01); *H05B 2203/003* (2013.01); *Y10T 74/20834* (2015.01)

(58) Field of Classification Search
CPC .... B62D 1/065; H05B 3/34; H05B 2203/005; H05B 2203/007; H05B 2203/011; H05B 2203/014; H05B 2203/017; H05B 2203/003; H05B 3/36; Y10T 74/20834

USPC ........................................... 219/204
See application file for complete search history.

(56) References Cited

U.S. PATENT DOCUMENTS

| | | | | |
|---|---|---|---|---|
| 1,345,249 A | * | 6/1920 | Rohne | 219/526 |
| 1,358,451 A | * | 11/1920 | Kay | 237/12.3 R |
| 1,388,488 A | * | 8/1921 | Senn | 219/204 |
| 1,429,799 A | * | 9/1922 | Tesdell | 219/204 |
| 1,518,085 A | * | 12/1924 | McDowell | 219/204 |
| 1,577,576 A | * | 3/1926 | Hamilton | 219/204 |
| 1,577,987 A | * | 3/1926 | Schwenk | 219/204 |

(Continued)

FOREIGN PATENT DOCUMENTS

| | | |
|---|---|---|
| JP | 2002-096739 A | 4/2002 |
| JP | 3966111 B2 | 2/2004 |
| JP | 2011-207451 A | 10/2011 |

OTHER PUBLICATIONS

Office Action mailed Nov. 29, 2016 issued in corresponding JP patent application No. 2014-003404.

*Primary Examiner* — Eric Stapleton
(74) *Attorney, Agent, or Firm* — Posz Law Group, PLC (57) ABSTRACT

A steering wheel includes a ring part, a boss part, spoke parts that connect the ring part and the boss part, a steering wheel main body that includes a core and a covering layer covering the ring part and the spoke parts in the vicinity of the ring part of the core, and a heater unit that warms up at least a portion of the ring part. The heater unit includes a heater main body that includes a base material having a sheet body and a linear heater, and is disposed in a state where an outer face side of the heater main body is covered by a cover layer of the covering layer and a connection part that connects the linear heater and a terminal of a lead wire for power feeding.

8 Claims, 8 Drawing Sheets

(56) References Cited

U.S. PATENT DOCUMENTS

| | | | | |
|---|---|---|---|---|
| 1,587,586 A * | 6/1926 | Hollis et al. | | 237/12.3 R |
| 1,615,635 A * | 1/1927 | Kuno | | 74/552 |
| 1,617,226 A * | 2/1927 | White et al. | | 237/12.3 R |
| 1,934,988 A * | 11/1933 | May | | 219/204 |
| 1,957,018 A * | 5/1934 | Martel | | 219/204 |
| 2,018,947 A * | 10/1935 | Claridge | | 219/204 |
| 2,163,450 A * | 6/1939 | Preble | | 219/204 |
| 2,392,539 A * | 1/1946 | Leible | | 219/204 |
| 2,530,559 A * | 11/1950 | Wilson | | 219/204 |
| 2,537,606 A * | 1/1951 | Steppan | | 219/204 |
| 2,652,476 A * | 9/1953 | Di Langiano | | 219/204 |
| 2,662,961 A * | 12/1953 | Sargent | | 219/204 |
| 2,772,338 A * | 11/1956 | Crowley | | 219/504 |
| 2,835,245 A * | 5/1958 | Morgan | | 126/208 |
| 2,835,777 A * | 5/1958 | Gates et al. | | 219/204 |
| 3,165,620 A * | 1/1965 | Miller | | 219/204 |
| 3,292,628 A * | 12/1966 | Maxwell et al. | | 607/111 |
| 4,471,209 A * | 9/1984 | Hollander | | 219/204 |
| 4,535,221 A * | 8/1985 | Holsworth | | 219/204 |
| 4,547,655 A * | 10/1985 | Kurata et al. | | 219/204 |
| 4,549,069 A * | 10/1985 | Oge | | 219/204 |
| 4,631,976 A * | 12/1986 | Noda et al. | | 74/552 |
| 4,640,340 A * | 2/1987 | Noda et al. | | 165/41 |
| 4,825,039 A * | 4/1989 | Yoo | | 219/212 |
| 4,937,429 A * | 6/1990 | Hollander | | 219/204 |
| 5,054,686 A * | 10/1991 | Chuang | | 236/49.3 |
| 5,098,771 A * | 3/1992 | Friend | | 428/209 |
| 5,206,485 A * | 4/1993 | Srubas et al. | | 219/549 |
| 5,294,775 A * | 3/1994 | Carrier | | 219/204 |
| 5,834,734 A * | 11/1998 | Ogata | | 219/204 |
| 5,847,360 A * | 12/1998 | Lorenzen et al. | | 219/204 |
| 5,850,741 A * | 12/1998 | Feher | | 62/3.61 |
| 5,901,615 A * | 5/1999 | Itoh et al. | | 74/552 |
| 6,007,420 A * | 12/1999 | Harm et al. | | 454/140 |
| 6,093,908 A * | 7/2000 | Haag | | 219/204 |
| 6,172,342 B1 * | 1/2001 | Khafagy et al. | | 219/497 |
| 6,326,593 B1 * | 12/2001 | Bonn et al. | | 219/204 |
| 6,365,875 B1 * | 4/2002 | Kreuzer et al. | | 219/204 |
| 6,392,195 B1 * | 5/2002 | Zhao et al. | | 219/204 |
| 6,441,344 B1 * | 8/2002 | Bonn et al. | | 219/204 |
| 6,509,552 B1 * | 1/2003 | Roske et al. | | 219/497 |
| 6,512,202 B2 * | 1/2003 | Haag et al. | | 219/204 |
| 6,707,006 B1 * | 3/2004 | Myers | | 219/204 |
| 6,727,467 B1 * | 4/2004 | Hadzizukic et al. | | 219/204 |
| 6,815,642 B2 * | 11/2004 | Haag et al. | | 219/204 |
| 7,091,450 B1 * | 8/2006 | Hollander | | 219/202 |
| 7,378,615 B1 * | 5/2008 | King | | 219/204 |
| 7,671,752 B2 * | 3/2010 | Sofer | | 340/576 |
| 8,188,406 B2 * | 5/2012 | Asami et al. | | 219/202 |
| 8,278,602 B2 * | 10/2012 | Yoneyama et al. | | 219/204 |
| 8,294,066 B2 * | 10/2012 | Gill et al. | | 219/201 |
| 8,330,079 B2 * | 12/2012 | Yasuda et al. | | 219/204 |
| 8,803,037 B2 * | 8/2014 | Paxton et al. | | 219/204 |
| 8,946,598 B2 * | 2/2015 | Hasegawa et al. | | 219/204 |
| 2001/0003336 A1 * | 6/2001 | Abbott et al. | | 219/543 |
| 2001/0030182 A1 * | 10/2001 | Haag et al. | | 219/204 |
| 2002/0008097 A1 * | 1/2002 | Hobby | | 219/204 |
| 2002/0033389 A1 * | 3/2002 | Sugiyama et al. | | 219/204 |
| 2002/0043525 A1 * | 4/2002 | Laken et al. | | 219/386 |
| 2002/0166407 A1 * | 11/2002 | Germuth-Loffler et al. | | 74/552 |
| 2002/0179595 A1 * | 12/2002 | Nagele | | 219/549 |
| 2003/0006228 A1 * | 1/2003 | Nagatomo | | 219/494 |
| 2003/0111453 A1 * | 6/2003 | Haag et al. | | 219/204 |
| 2003/0218004 A1 * | 11/2003 | Yoneyama et al. | | 219/528 |
| 2004/0007567 A1 * | 1/2004 | Downey et al. | | 219/494 |
| 2004/0155020 A1 * | 8/2004 | Worrell et al. | | 219/204 |
| 2004/0261567 A1 * | 12/2004 | Menaldo et al. | | 74/522 |
| 2005/0268744 A1 * | 12/2005 | Embach et al. | | 74/551.9 |
| 2006/0096409 A1 * | 5/2006 | Weiss et al. | | 74/552 |
| 2006/0118538 A1 * | 6/2006 | Jones et al. | | 219/204 |
| 2007/0007266 A1 * | 1/2007 | Sasaki et al. | | 219/202 |
| 2007/0101728 A1 * | 5/2007 | Ruetz | | 62/3.61 |
| 2007/0151405 A1 * | 7/2007 | Matsu et al. | | 74/552 |
| 2007/0210050 A1 * | 9/2007 | Choi | | 219/204 |
| 2008/0034915 A1 * | 2/2008 | Bigolin | | 74/551.9 |
| 2008/0116188 A1 * | 5/2008 | Fukuda et al. | | 219/204 |
| 2008/0210048 A1 * | 9/2008 | Yoneyama et al. | | 74/552 |
| 2009/0114368 A1 * | 5/2009 | Niwa et al. | | 165/42 |
| 2009/0224523 A1 * | 9/2009 | Park | | 280/771 |
| 2010/0193495 A1 * | 8/2010 | Pate | | 219/204 |
| 2011/0056930 A1 * | 3/2011 | Letzas et al. | | 219/546 |
| 2011/0073582 A1 | 3/2011 | Morita et al. | | |
| 2012/0118869 A1 * | 5/2012 | Saunders et al. | | 219/204 |
| 2012/0312796 A1 * | 12/2012 | Cho | | 219/204 |
| 2013/0055849 A1 * | 3/2013 | Parameshwara et al. | | 74/558 |
| 2013/0180354 A1 * | 7/2013 | Maranville et al. | | 74/552 |
| 2013/0228561 A1 * | 9/2013 | Cho | | 219/204 |
| 2013/0292368 A1 * | 11/2013 | Cho | | 219/204 |

* cited by examiner

STEERING WHEEL WITH ACCOMMODATION CONCAVE PORTIONS FOR HEATER UNIT CONNECTION PARTS

CROSS-REFERENCE TO RELATED APPLICATIONS

This application claims the benefit of Japanese Patent Application No. 2014-003404 (filed on Jan. 10, 2014), the entire contents of which are incorporated herein by reference.

BACKGROUND

1. Technical Field

The present invention relates to a steering wheel having a heater unit configured to warm up at least a portion of a ring part.

2. Related Art

In the related art, a steering wheel having a heater unit has been known in which a connection part configured to connect a linear heater of a heater main body arranged in a ring part and a terminal of a lead wire for power feeding extending from a boss part-side is arranged in the boss part of the steering wheel (for example, refer to Japanese Patent No. 3,966,111).

A volume of the connection part is likely to increase because the linear heater and the terminal of the lead wire are connected by a soldering, a spot welding and the like and a surrounding of the connected part thereof is covered with a heat shrinkable tube and the like, considering a waterproof property. In recent years, since the boss part of the steering wheel is configured to accommodate therein not only an airbag device but also a variety of switches and the like, it is difficult to secure a space for accommodating the connection part having a large volume. That is, there is a room for improvement in securing an accommodation place of the connection part.

SUMMARY

According to an aspect of the invention, a steering wheel includes a ring part to be gripped on steering, a boss part that is arranged at a substantial center of the ring part, a plurality of spoke parts that connect the ring part and the boss part, a steering wheel main body that includes a core arranged to interconnect the ring part, the boss part and the spoke parts, and a covering layer covering the ring part and the spoke parts in the vicinity of the ring part of the core, and a heater unit that warms up at least a portion of the ring part and includes a heater main body that includes a base material having a sheet body having flexibility and a linear heater supported by the base material, and is disposed in a state where an outer face side of the heater main body is covered by a cover layer of the covering layer, and a connection part that connects the linear heater and a terminal of a lead wire for power feeding extending from the boss part.

In the steering wheel, the core or covering layer is formed with an accommodation concave portion recessed from a surrounding thereof and configured to accommodate therein the connection part, in a vicinity of a boundary part between the ring part and the spoke part, and an outer surface of the accommodation concave portion is covered by a surface-side material arranged on a surface-side of the steering wheel and composed of a constitutional component for the steering wheel arranged in a vicinity of the cover layer or spoke part.

It is therefore an object of the present invention to provide a steering wheel capable of accommodating therein a connection part of a heater unit without any difficulty.

According to the steering wheel of the present invention, the accommodation concave portion capable of accommodating therein the connection part of the heater unit is formed and arranged by recessing the core or covering layer in the vicinity of the boundary between the ring part and the spoke part. Therefore, it is possible to smoothly accommodate the connection part having a volume larger than the lead wire and the linear heater in the accommodation concave portion without influencing the surrounding members. In the steering wheel of the present invention, since it is possible to arrange the connection part provided for the heater unit without narrowing a surrounding space, it is possible to arrange a variety of functional components such as an audio switch, a cruise control switch, a switch for phone call, a monitor changeover switch and the like around an airbag device. Also, when the connection part is accommodated in the accommodation concave portion, a deviation of the connection part is restrained by an inner periphery wall of the accommodation concave portion. Therefore, it is possible to assemble the functional components without any difficulty.

Also, according to the steering wheel of the present invention, an outer surface of the accommodation concave portion is covered by a surface-side material arranged on a surface-side of the steering wheel and composed of a constitutional component for the steering wheel arranged in a vicinity of the cover layer or spoke part. When the accommodation concave portion is configured so that the outer surface is covered by a pad, a switch, a lower cover and the like, which are the constitutional components for the steering wheel, even though the connection part is accommodated in the accommodation concave portion, an outward appearance of the steering wheel is not deteriorated and a design characteristic of the steering wheel is also favorable. Also, even when the outer surface of the accommodation concave portion is configured to be covered by the cover layer of the covering layer, the connection part is arranged in the accommodation concave portion and does not partially protrude. Therefore, it is possible to favorably keep a feeling when a user grips the steering wheel upon the steering.

Therefore, according to the present invention, it is possible to accommodate the connection part of the heater unit in the steering wheel without any difficulty.

Also, according to the steering wheel of the present invention, since the connection part is arranged in the vicinity of the boundary between the ring part and the spoke part, i.e., in the vicinity of the ring part, it is possible to shorten a spaced distance from the heater unit as much as possible. In other words, since it is possible to shorten a length size (a length size of a part of the linear heater exposed from the base material) of the linear heater corresponding to a part extending from the heater main body to a connected part with the lead wire, as much as possible, it is possible to favorably keep the operability when attaching the heater unit to the steering wheel main body.

DETAILED DESCRIPTION

Figure 1:
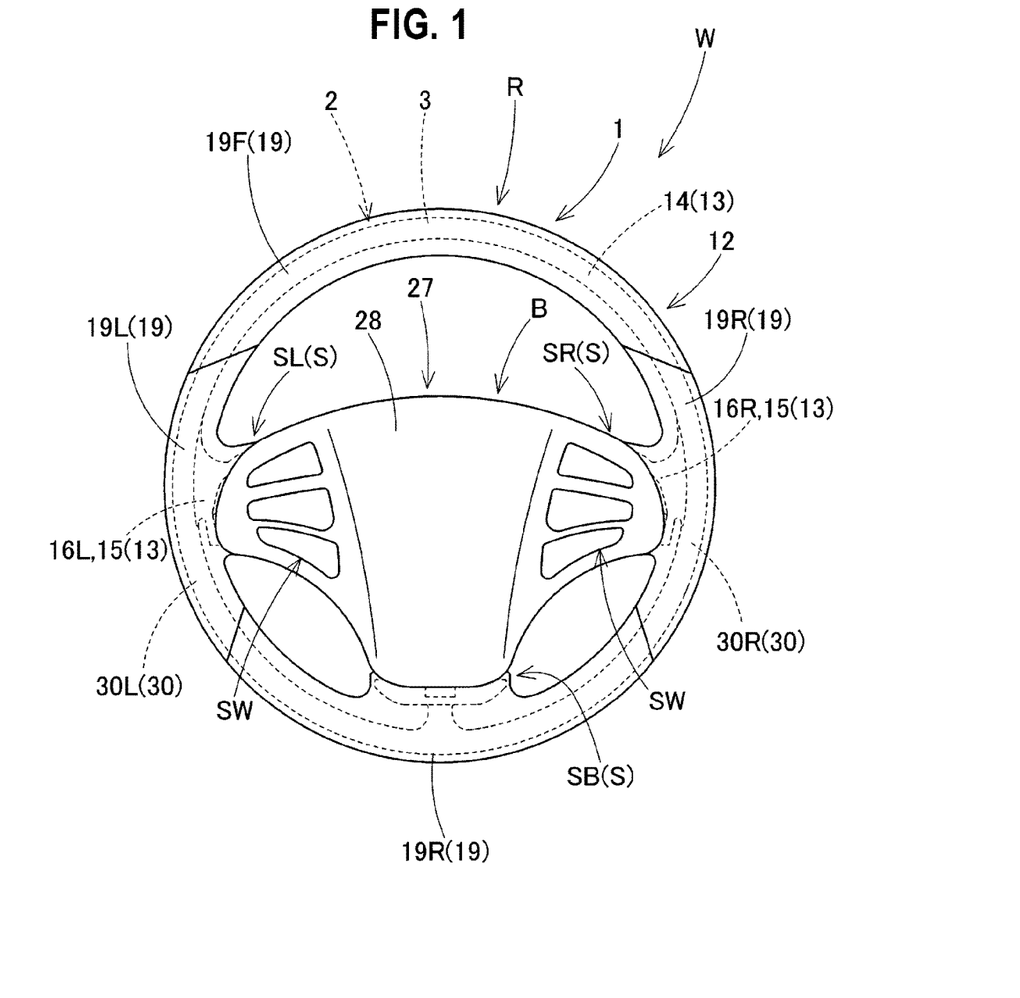
FIG. 1 is a plan view of a steering wheel according to an illustrative embodiment of the present invention.

Hereinafter, an illustrative embodiment of the present invention will be described with reference to the drawings. In the illustrative embodiment, a leather-wrapped steering wheel W will be exemplified. As shown in FIG. 1, the steering wheel W has a ring part R gripped upon steering, a boss part B arranged at a substantial center of the ring part R and a plurality of (three, in the illustrative embodiment) spoke parts S configured to connect the ring part R and the boss part B. Regarding constitutional components, the steering wheel W has a steering wheel main body 1, an airbag device 27 arranged above the boss part B and heater units 30L, 30R configured to warm up at least a portion of the ring part R. Also, in the steering wheel W of the illustrative embodiment, switches SW such as an audio switch, a cruise control switch, a switch for phone call, a monitor change-over switch and the like are arranged to be exposed from a surface of a pad 28 at parts (left and right parts of a folded airbag and an inflator, which will be described later) of the boss part B facing a left spoke part SL and a right spoke part SR (refer to FIG. 1).

Also, in the specification, the front-rear, upper-lower and left-right directions are described on the basis of a state where a steering wheel W mounted on a vehicle is operated for straight steering, as long as there is no particular problem. That is, a direction conforming to a rotation center shaft of the ring part R is referred to as an upper-lower direction, a direction orthogonal to the rotation center shaft of the ring part R and substantially conforming to a longitudinal direction of a vehicle is referred to as a front-rear direction and a direction orthogonal to the rotation center shaft of the ring part R and substantially conforming to a width direction of the vehicle is referred to as a left-rear direction.

Figure 7:
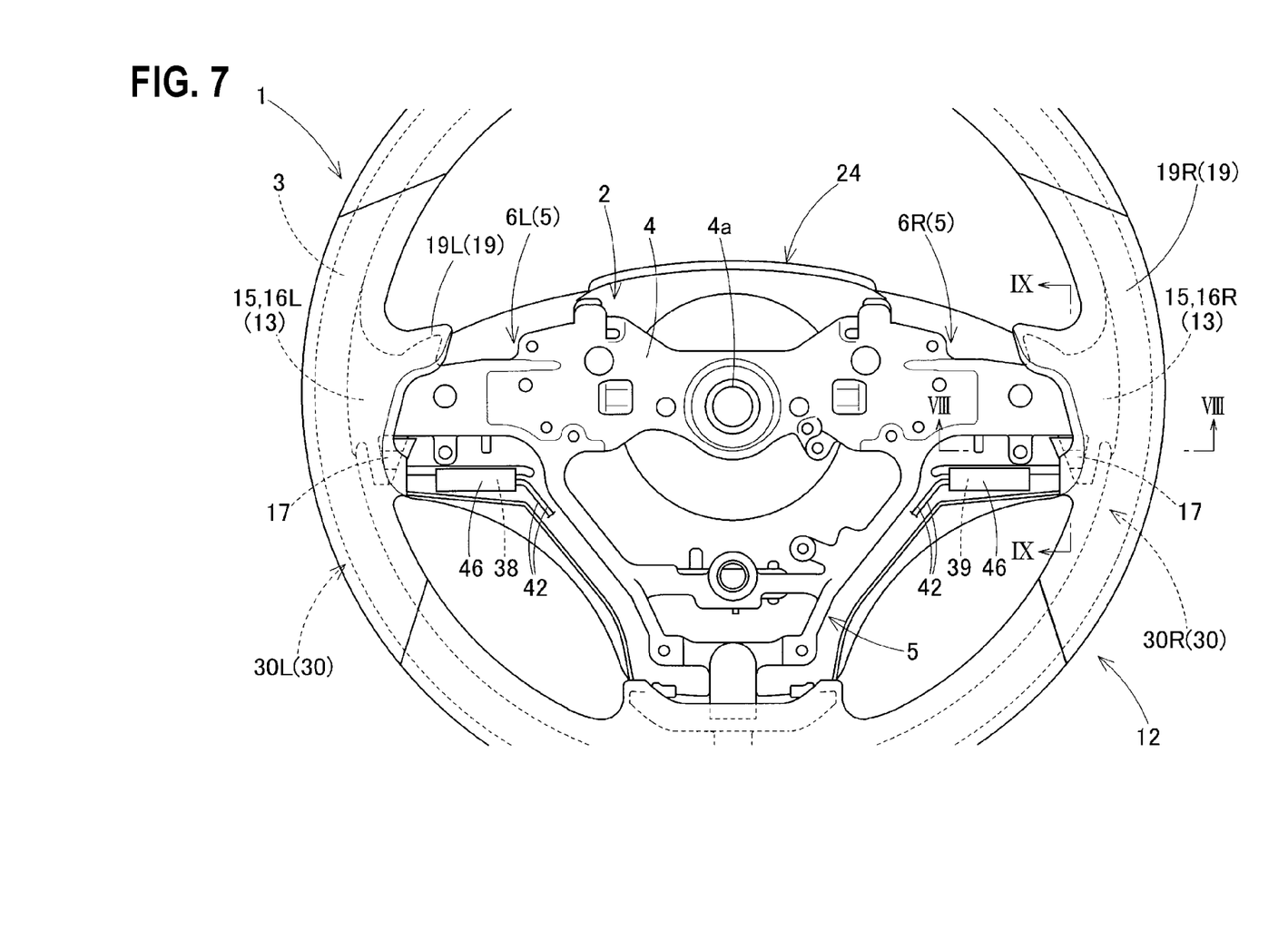
FIG. 7 is a partially enlarged sectional view showing a state before an airbag device is attached to the steering wheel of the illustrative embodiment.

As shown in FIGS. 1 and 7, the steering wheel main body 1 has a core 2 arranged to interconnect the ring part R, the boss part B and the spoke parts S, a covering layer 12 configured to cover the ring part R and portions of the spoke parts S in the vicinity of the ring part R of the core 2, and a lower cover 24 configured to cover a lower surface of the boss part B.

Figure 2:
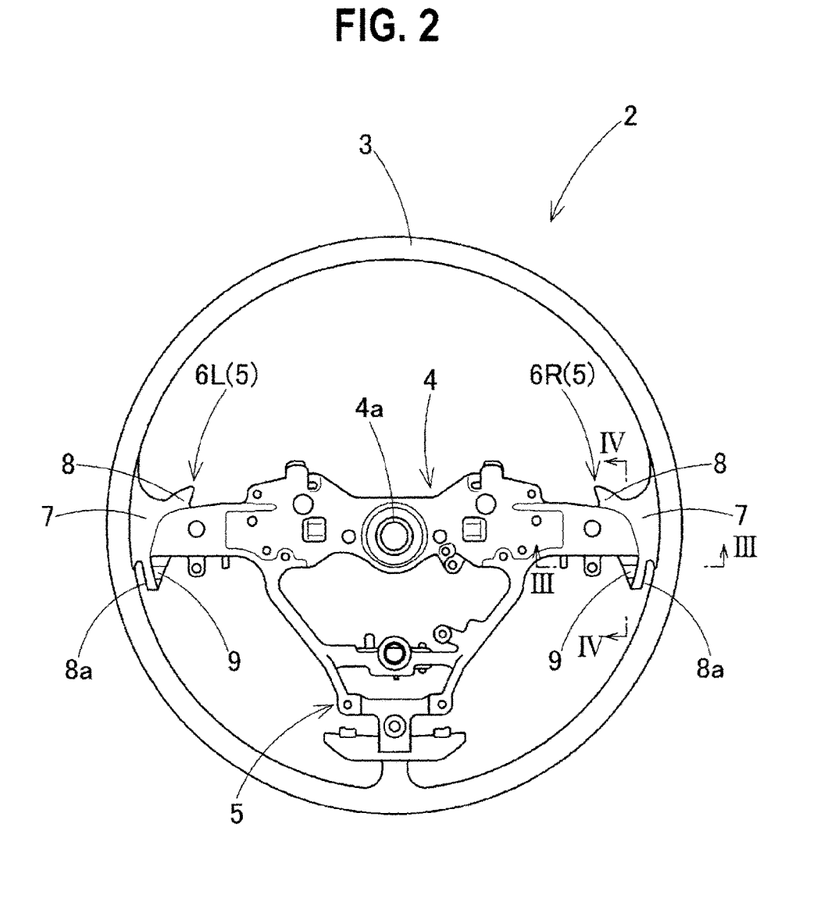
FIG. 2 is a plan view of a core configuring the steering wheel of the illustrative embodiment.
Figure 3:
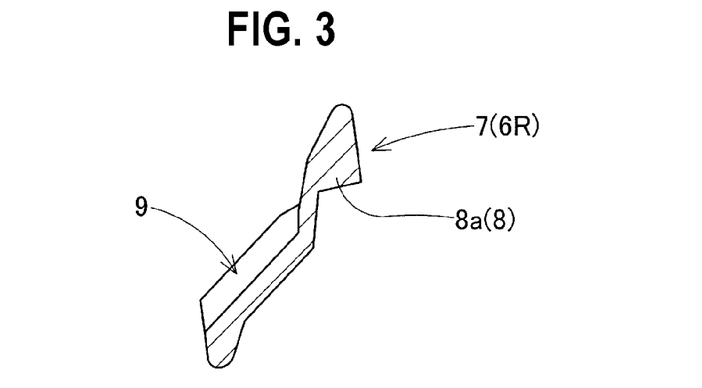
FIG. 3 is a partially enlarged sectional view of the core shown in FIG. 2, taken along a line III-III of FIG. 2.
Figure 4:
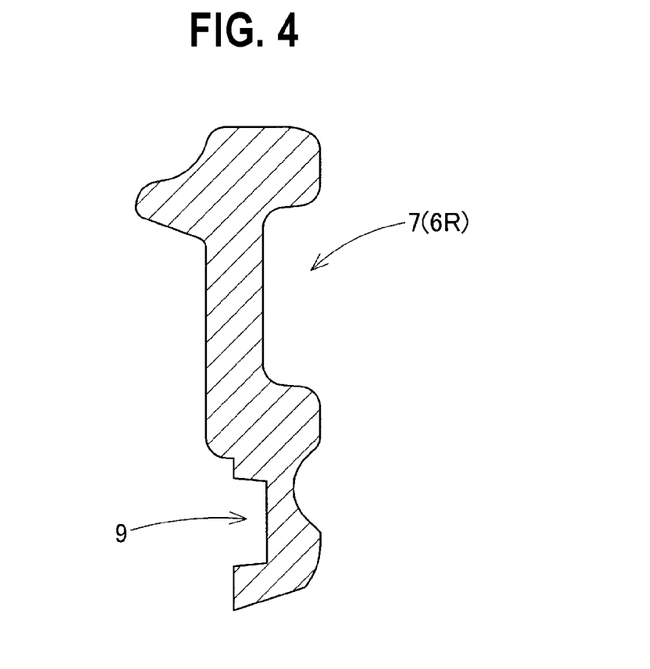
FIG. 4 is a partially enlarged sectional view of the core shown in FIG. 2, taken along a line IV-IV of FIG. 2.

As shown in FIG. 2, the core 2 has a ring part core 3 arranged at the ring part R and having a substantial circular ring shape, a boss part core 4 arranged at the central boss part B and a spoke part core 5 arranged at the spoke parts S. A boss 4a becoming a coupling part with a steering shaft (not shown) is arranged at a center of the boss part core 4. Root-side parts 7, which are in the vicinities of boundaries between the ring part core 3 and a left spoke part core 6L and a right spoke part core 6R arranged at the left spoke part SL and the right spoke part SR extending leftwards and rightwards from the boss part B, are formed with notched concave portions 9 recessed from the peripheries and configuring accommodation concave portions 17 for accommodating therein connection parts 44, 44 of the heater units 30L, 30R, respectively (refer to FIGS. 3 and 4). Specifically, the notched concave portion 9 is configured by notching an upper surface of a part from above, which becomes an inner side in the left-right direction at a rear end 8a of a protrusion 8 more protruding upwardly than a surrounding part at the root-side part 7 of the left spoke part core 6L (the right spoke part core 6R), has a substantially rectangular sectional shape in the front-rear direction and extends substantially in the left-right direction. The core 2 is formed by a die casting method in which the boss 4a is made of steel and the other parts are made of a light alloy material such as aluminum.

Figure 8:
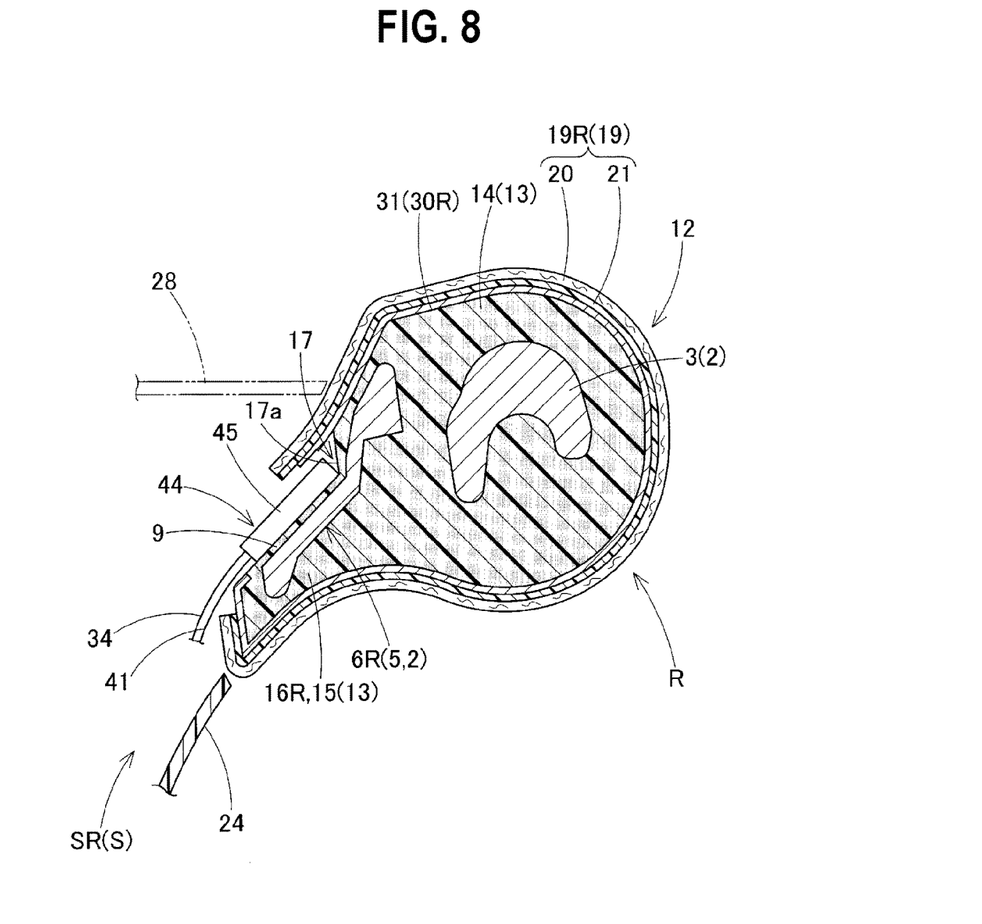
FIG. 8 is a partially enlarged sectional view taken along a line VIII-VIII of FIG. 7.
Figure 9:
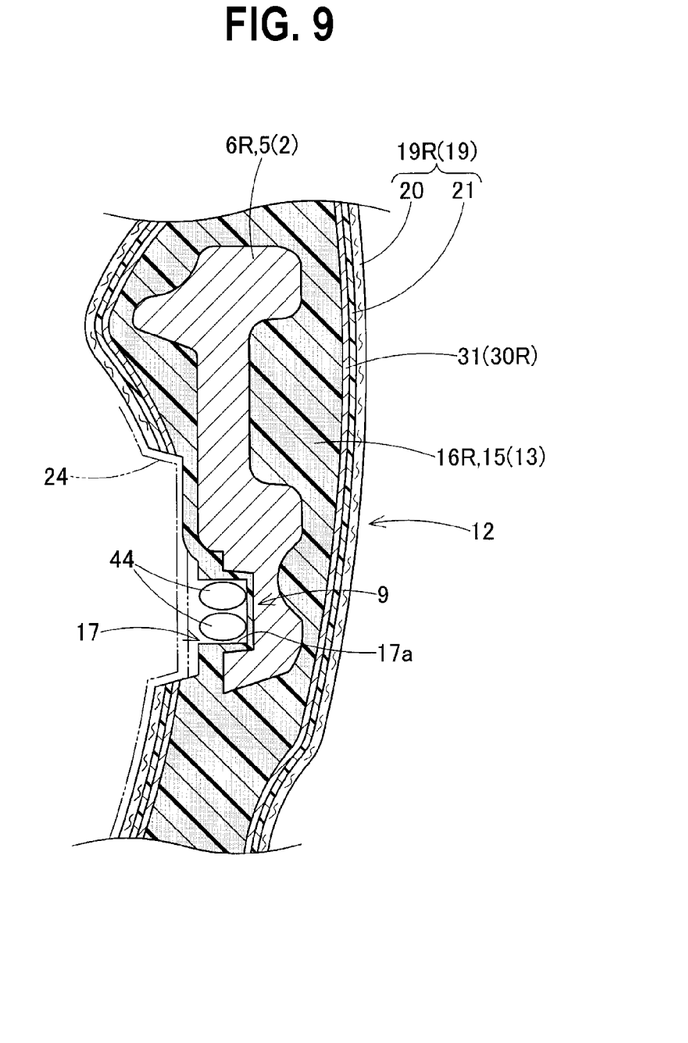
FIG. 9 is a partially enlarged sectional view taken along a line IX-IX of FIG. 7.

As shown in FIGS. 8 and 9, the covering layer 12 has a center-side layer 13 configured to cover the surrounding of the core 2 and a cover layer 19 arranged on an outer periphery-side. The center-side layer 13 is formed of a synthetic resin such as polyurethane and has a substantially elliptical sectional shape at the ring part R. The center-side layer 13 has a ring-side part 14 configured to the outer periphery-side of the ring part R and a spoke-side part 15 configured to the spoke parts S in the vicinity of the ring part R. At the spoke-side part 15, a left part 16L and a right part 16R configured to cover the outer periphery-sides of the root-side parts (the parts adjacent to the boundaries between the left spoke part SL and right spoke part SR and the ring part R) of the left spoke part core 6L and the right spoke part core 6R are respectively formed with the accommodation concave portions 17 recessed from the surrounding so as to accommodate therein connection parts 44, 44 of the heater units 30L, 30R. As shown in FIGS. 8 and 9, the accommodation concave portions 17 are formed at positions corresponding to the notched concave portions 9 formed at the root-side parts 7 of the left spoke part core 6L and the right spoke part core 6R. The center-side layer 13 is formed to thinly cover the entire outer periphery of the notched concave portion 9 at the notched concave portion 9, and the notched concave portion 9 is recessed from the surrounding to arrange the accommodation concave portion 17 therein. That is, in the illustrative embodiment, the accommodation concave portion 17 is configured not to expose the notched concave portion 9 (the core 2). In the illustrative embodiment, as shown in FIGS. 8 and 9, the accommodation concave portion 17 is formed to extend substantially in the left-right direction by recessing the center-side layer 13 to have a substantially rectangular section from an upper surface of an inner periphery-side. The accommodation concave portions 17 are set to have a size capable of suppressing protrusion of the two connection parts 44, 44 of the heater units 30 from the surface of the surrounding center-side layer 13 and accommodating therein the connection parts 44, 44. Also, in the illustrative embodiment, the accommodation concave portions 17 are configured so that outer periphery-sides (upper surface-sides) of outer areas in the left-right direction are covered by the cover layers 19L, 19R of the covering layer 12 and outer periphery-sides (upper surface-sides) of inner areas in the left-right direction are covered by the pad 28 of the airbag device 27 (refer to FIGS. 8 and 9).

In the illustrative embodiment, the cover layer 19 has a cover main body 20 and a soft foamed material layer 21 arranged on an inner periphery-side of the cover main body 20 (refer to FIGS. 8 and 9). The cover main body 20 is made of leather such as natural leather, synthetic leather or artificial leather. The soft foamed material layer 21 is configured by bonding a sheet body composed of a rubber foamed material on an inner periphery-side of the cover main body 20. Also, in the illustrative embodiment, the cover layer 19 is divided into four parts so as to respectively cover outer peripheries of four front, rear, left and right divided areas of the ring part R. (refer to FIG. 1). The cover layer 19L arranged at the left side is arranged to cover areas of the ring part R at the front and rear of the left spoke part SL from an area of the left spoke part SL facing the ring part R, and the cover layer 19R arranged at the right side is arranged to cover areas of the ring part R at the front and rear of the right spoke part SR from an area of the right spoke part SR facing the ring part R. The cover layer 19B arranged at the rear side is arranged to cover areas of the ring part R at the left and right of the rear spoke part SB from an area of the rear spoke part SB facing the ring part R, and the cover layer 19F arranged at the front side is arranged to cover a front area of the ring part R.

The lower cover 24 is made of synthetic resin, and is configured to cover lower surfaces of the boss part B and portions of the spoke parts S facing the boss part B, as shown in FIGS. 7 and 8.

The airbag device 27 arranged above the boss part B has a folded and accommodated airbag (not shown), an inflator (not shown) configured to supply an inflation gas to the airbag and the pad 28 configured to cover an upper surface of the folded airbag. As shown in FIG. 1, the pad 28 is arranged to cover the upper surfaces of the boss part B and the portions of the spoke parts S facing the boss part B. Also, at a lower surface of the pad 20, a switch unit configuring the switches SW exposed on the surface of the pad 28, as described above, is accommodated at left and right sides of the folded airbag and inflator, which are the left spoke part SL-side and the right spoke part SR-side, without a gap.

Figure 5:
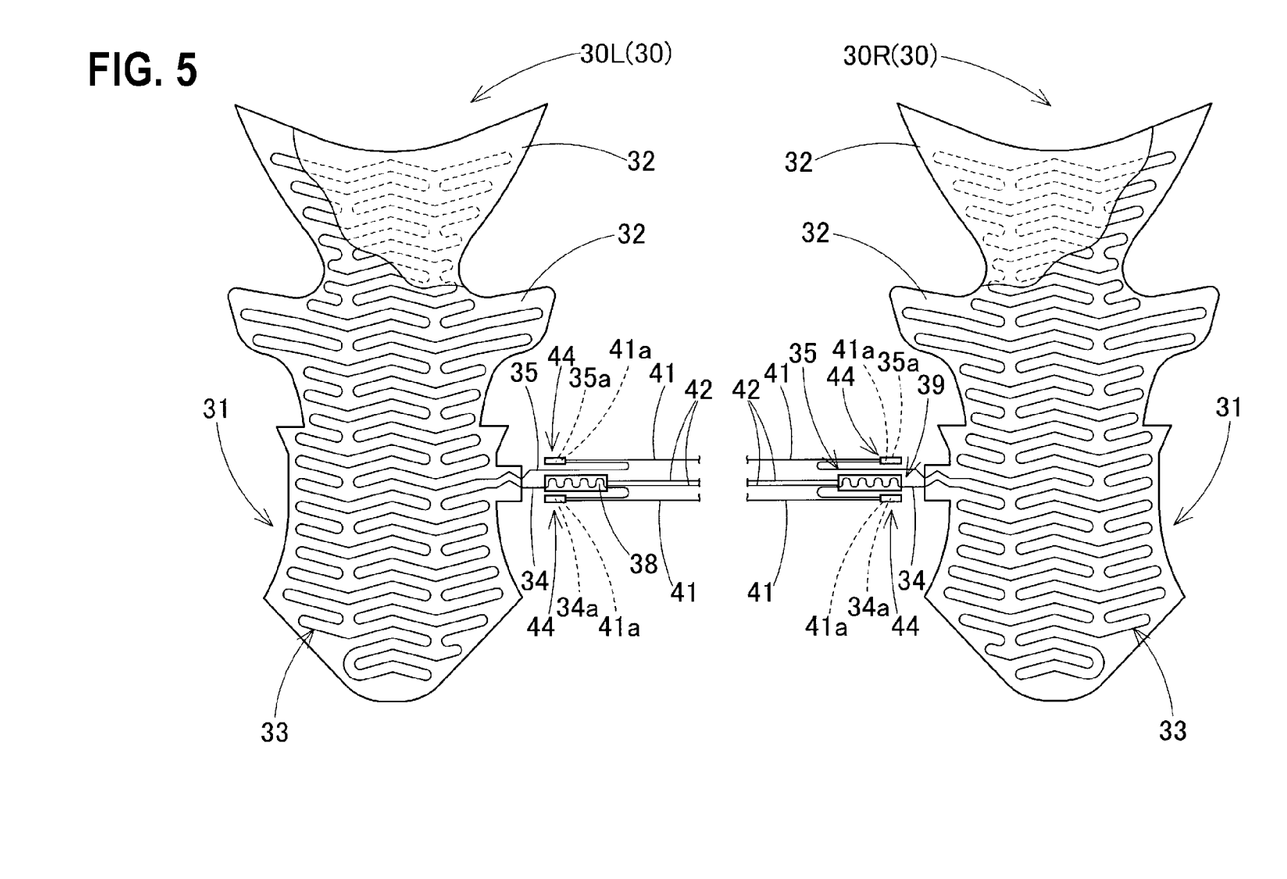
FIG. 5 is a schematic plan view showing a state where heater units configuring the steering wheel of the illustrative embodiment are arranged in a row.
Figure 6A:
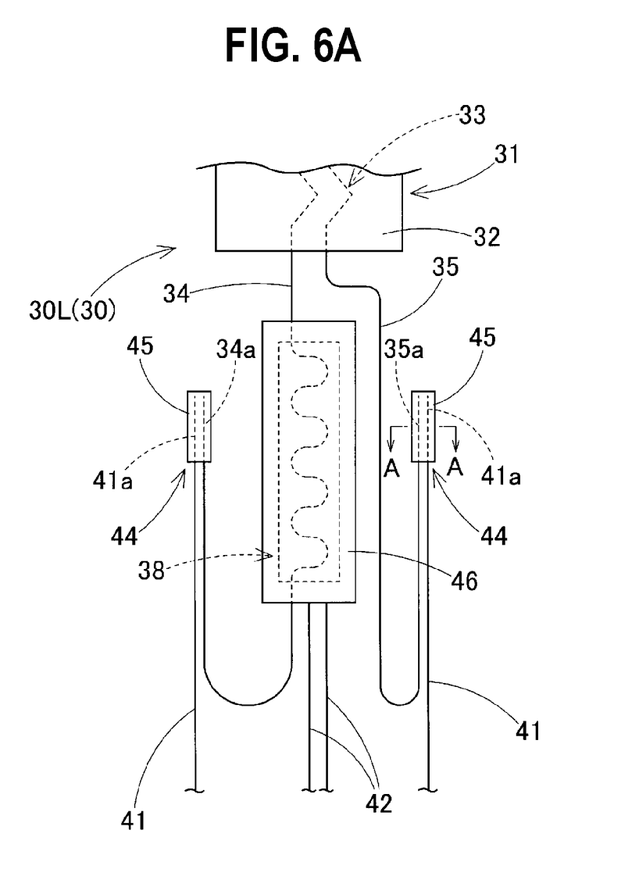
FIG. 6A is a partially enlarged schematic plan view of the heater unit shown in FIG. 5.
Figure 6B:
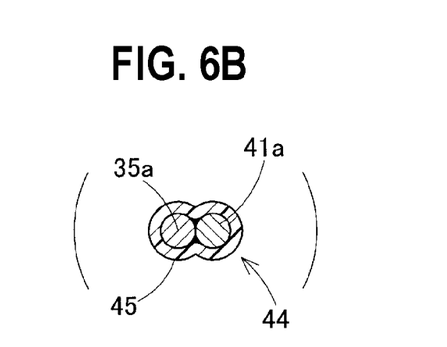
FIG. 6B is an enlarged sectional view taken along a line A-A of FIG. 6A

In the illustrative embodiment, a pair of the heater units 30 (30L, 30R) is arranged to warm up the portions of the ring part R in the vicinities of the left spoke part SL-side and the right spoke part SR, respectively (FIGS. 1, 5 and 7). Each of the heater units 30L, 30R is electrically connected to a control device (not shown), which is arranged at the lower cover 24-side and has a power supply circuit, through lead wires 41, 42. In the illustrative embodiment, the heater unit 30L arranged at the left side has a heater main body 31, a thermistor 38 configured to detect a temperature of a linear heater 33 configuring the heater main body 31, and two connection parts 44, 44 configured to connect terminals 34a, 35a of terminal-side parts 34, 35, which are both ends of the linear heater 33 extending from the heater main body 31, and terminals 41a, 41a of the two lead wires 41, 41. The heater unit 30R arranged at the right side has a heater main body 31, a thermostat 39 configured to control a temperature of a linear heater 33 configuring the heater main body 31, and two connection parts 44, 44 configured to connect terminals 34a, 35a of terminal-side parts 34, 35 of the linear heater 33 extending from the heater main body 31 and terminals 41a, 41a of the two lead wires 41, 41.

As shown in FIGS. 8 and 9, the heater main bodies 31 of the respective heater units 30L, 30R have base materials 32 of which outer surfaces are covered by the cover layers 19L, 19R and which are respectively interposed between the cover layers 19L, 19R and the center-side layer 13 and have flexibility, and the linear heaters 33. The heater main body 31 has a thickness of about 1 to 2 mm. Each base material 32 has a bilaterally symmetric shape so that a flatly developed outward shape substantially conforms to a flatly developed outward shape of each of the cover layers 19L, 19R (refer to FIG. 5). The base material 32 is a sheet body obtained by forming a foamed polyurethane resin into a sheet shape. In the illustrative embodiment, the two base materials 32 are overlapped to interpose the linear heater 33 therebetween. As shown in FIG. 5, the linear heater 33 continuously extends without any disconnection in a predetermined pattern so that it is arranged throughout all over the base material 32. Also, the linear heater 33 is arranged so that the terminal-side parts 34, 35, which are both ends of the linear heater 33, protrude from a part of the base material 32 disposed in the vicinity of a boundary between the ring part R and a rear edge-side of the left spoke part SL or right spoke part SR. Also, the one part 34 of the terminal-side parts 34, 35 of each linear heater 33, which protrude from the base material 32, is configured to pass through the thermistor 38 or thermostat 39 and to expose the terminal 34a thereof, and the other part 35 is configured to expose the terminal 35a, as it is (refer to FIGS. 5 and 6).

The thermistor 38 arranged at the left heater unit 30L is provided to detect the temperature of the linear heater 33 and is configured to contact the terminal-side part 34 of the linear heater 33 protruding from the base material 32, thereby detecting the temperature of the linear heater 33. Also, the thermistor 38 is electrically connected to the control device (not shown) through the two lead wires 42, 42. In the illustrative embodiment, the thermistor 38 is bonded to a part of the inner periphery-side (the upper surface-side) of the lower cover 24 in the vicinity of the left spoke part SL (refer to FIG. 7) with an outer periphery-side thereof being covered by a cover member 46 (refer to FIG. 6A) made of the same material as the base material 32.

The thermostat 39 arranged at the right heater unit 30R is provided to control the temperature of the linear heater 33 and is configured to contact the terminal-side part 34 of the linear heater 33 protruding from the base material 32, thereby detecting and controlling the temperature of the linear heater 33. Also, the thermostat 39 is electrically connected to the control device (not shown) through the two lead wires 42, 42. In the illustrative embodiment, the thermostat 39 is bonded to a part of the inner periphery-side (the upper surface-side) of the lower cover 24 in the vicinity of the right spoke part SL with an outer periphery-side thereof being covered by the cover member 46 (refer to FIG. 7).

In the heater units 30L, 30R of the illustrative embodiment, the terminal-side part 34 and the other terminal-side part 35 of each linear heater 33 extending from the thermistor 38 or thermostat 39 are configured to connect the lead wires 41, 41 extending from the control device (not shown) and the terminals 34a, 35a; 41a each other, thereby forming the connection parts 44, 44. In the illustrative embodiment, the connection parts 44 are respectively formed by overlapping the terminals 34a, 35a of the terminal-side parts 34, 35 of each linear heater 33 and the terminals 41a of the lead wires 41 so that the positions of the edges thereof substantially coincide with each other, connecting the terminals 34a, 35a, 41a by a soldering, a spot welding and the like and covering the surroundings thereof by a heat shrinkable tube 45 (refer to FIG. 6B). Each connection part 44 is a rod-shaped body having stiffness of which a length size is about 10 mm, a width size is about 5 mm and a height size is about 4 mm.

The steering wheel W of the illustrative embodiment can be manufactured as follows. First, the heater main body 31 is wound on the outer periphery-side of the center-side layer 13 and is bonded to the center-side layer 13 by using an adhesive and the like, and the connection parts 44 are accommodated in the accommodation concave portion 17, so that each of the heater units 30L, 30R is attached to the core 2 having the center-side layer 13 formed around the ring part core 3 or spoke part core 5 in the vicinity of the ring part R. After that, the cover layer 19 (19L, 19R, 19F, 19B) is wound on the ring part R to form the covering layer 12. Then, the lower cover 24 is attached to the core 2 to manufacture the steering wheel main body 1. After that, the thermistor 38 and the thermostat 39 of the heater units 30L, 30R are bonded to the predetermined positions of the lower cover 24 and the airbag device 27 is attached to the steering wheel main body 1, so that the steering wheel W is manufactured.

In the steering wheel W of the illustrative embodiment, the center-side layer 13 of the covering layer 12 is formed with the accommodation concave portions 17, which can accommodate therein the connection parts 44 of the heater units 30L, 30R and are recessed from the surrounding by recessing the core 2 and the center-side layer 13, in the vicinities of the boundaries between the ring part R and the left spoke part SL and right spoke part SR. Therefore, it is possible to smoothly accommodate the two connection parts 44, 44 having a volume larger than the lead wires 41, 42 and linear heaters 33 in the accommodation concave portions 17 without influencing the surrounding members. In the steering wheel W of the illustrative embodiment, since it is possible to arrange the connection parts 44 provided for the heater units 30L, 30R without narrowing the surrounding space, it is possible to arrange a variety of the switches SW (functional components) such as an audio switch, a cruise control switch, a switch for phone call, a monitor changeover switch and the like around the airbag device 27 without any difficulty. Also, when the connection parts 44 are accommodated in the accommodation concave portion 17, a deviation of the connection parts 44 is restrained by an inner periphery wall 17a (refer to FIGS. 8 and 9) of the accommodation concave portion 17. Therefore, after attaching the heater units 30L, 30R, it is possible to assemble the functional components such as the switches SW and the airbag device 27 without any difficulty.

Also, the accommodation concave portions 17 are configured so that the outer surfaces thereof are covered by the cover layers 19L, 19R and the pad 28 of the airbag device 27 on which surface the operations parts of the switches SW are exposed. Therefore, even when the connection parts 44 are arranged therein, an outward appearance of the steering wheel W is not deteriorated and a design characteristic of the steering wheel W is improved. Also, the connection parts 44 are arranged in the accommodation concave portions 17 even in the areas covered by the cover layers 19L, 19R, so that the connection parts 44 do not partially protrude from the surrounding center-side layer 13. Therefore, it is possible to favorably keep the feeling when a user grips the steering wheel W upon the steering.

In this way, according to the steering wheel W, it is possible to accommodate the connection parts 44 of the heater units 30L, 30R without any difficulty.

Also, in the steering wheel W of the illustrative embodiment, since the connection parts 44, 44 are arranged in the vicinities of the boundaries between the ring part R and the left spoke part SL and right spoke part SR, i.e., in the vicinity of the ring part R, it is possible to reduce the spaced distance from the heater main bodies 31 as much as possible. In other words, since it is possible to shorten the length sizes of the terminal-side parts 34, 35 of the linear heaters 33 corresponding to a part extending from the heater main bodies 31 to the connected parts with the lead wires 41, as much as possible, it is possible to favorably keep the operability when attaching the heater units 30L, 30R to the steering wheel main body 1 (the core 2).

Also, in the steering wheel W of the illustrative embodiment, the accommodation concave portion 17 is formed by recessing the center-side layer 13 of the covering layer 12 from the upper of the inner periphery-side. However, the accommodation concave portion may be recessed from any of the inner periphery-side, the outer periphery-side, the upper side and the lower side. For example, the accommodation concave portion may be formed by recessing the covering layer from the lower of the outer periphery-side in the vicinity of the boundary between the ring part and the spoke part. Also in this configuration, when the outer periphery-side (the lower surface-side) of the accommodation concave portion is covered by the lower cover and the like, the outward appearance of the steering wheel W is not deteriorated and the design characteristic of the steering wheel W can be kept favorable. Also, in the steering wheel W of the illustrative embodiment, the accommodation concave portion 17 is formed by recessing both the center-side layer 13 of the covering layer 12 and the core 2. However, the accommodation concave portion may be formed by recessing only the covering layer inasmuch as the connection part is positioned at a part at which only the covering layer is arranged.

What is claimed is:

1. A steering wheel comprising:
a steering wheel main body that includes
a core including
a ring part to be gripped on steering,
a boss part that is arranged at a substantial center of the ring part, and
a plurality of spoke parts that connect the ring part and the boss part; and
a covering layer covering the ring part and the spoke parts in the vicinity of the ring part of the core; and
a heater unit that warms up at least a portion of the covering layer on the ring part and includes
a heater main body that includes a base material having a sheet body having flexibility and a linear heater supported by the base material, and is disposed in a state where an outer face side of the heater main body is covered by a cover layer of the covering layer, and
a connection part that connects the linear heater and a terminal of a lead wire for power feeding extending from the boss part, wherein
only the covering layer is formed with an accommodation concave portion recessed from a surrounding thereof and configured to accommodate therein the connection part, in a vicinity of a boundary part between the ring part and the spoke part, and
an outer surface of the accommodation concave portion is covered by a surface-side material arranged on a surface-side of the steering wheel and composed of a constitutional component for the steering wheel arranged in a vicinity of the cover layer or spoke part.

2. A steering wheel comprising:
a steering wheel main body that includes
a core including
a ring part to be gripped on steering,
a boss part that is arranged at a substantial center of the ring part, and
a plurality of spoke parts that connect the ring part and the boss part; and a covering layer covering the ring part and the spoke parts in the vicinity of the ring part of the core; and a heater unit that warms up at least a portion of the covering layer on the ring part and includes a heater main body that includes a base material having a sheet body having flexibility and a linear heater supported by the base material, and is disposed in a state where an outer face side of the heater main body is covered by a cover layer of the covering layer, and a connection part that connects the linear heater and a terminal of a lead wire for power feeding extending from the boss part, wherein the core or covering layer is formed with an accommodation concave portion recessed from a surrounding thereof and configured to accommodate therein the connection part, in a vicinity of a boundary part between the ring part and the spoke part, an outer surface of the accommodation concave portion is covered by a surface-side material arranged on a surface-side of the steering wheel and composed of a constitutional component for the steering wheel arranged in a vicinity of the cover layer or spoke part, and at least one side of the accommodation concave portion is open, wherein the core and covering layer are formed with the accommodation concave portion recessed from the surrounding thereof and configured to accommodate therein the connection part, in a vicinity of a boundary part between the ring part and the spoke part.

3. The steering wheel according to claim 2, wherein the core further comprises a root-side part having a notched concave portion recessed from a periphery of the root-side part that defines the accommodation concave portion.

4. The steering wheel according to claim 2, wherein the covering layer comprises a center-side layer and a cover layer, the center-side layer defining the accommodation concave portion, the cover layer comprising the surface-side material that covers the outer surface of the accommodation concave portion.

5. A steering wheel comprising:

a steering wheel main body that includes a core including a ring part to be gripped on steering, a boss part that is arranged at a substantial center of the ring part, and a plurality of spoke parts that connect the ring part and the boss part; and a covering layer covering the ring part and the spoke parts in the vicinity of the ring part of the core; and a heater unit that warms up at least a portion of the covering layer on the ring part and includes a heater main body that includes a base material having a sheet body having flexibility and a linear heater supported by the base material, and is disposed in a state where an outer face side of the heater main body is covered by a cover layer of the covering layer, and a connection part that connects the linear heater and a terminal of a lead wire for power feeding extending from the boss part, wherein the core or covering layer is formed with an accommodation concave portion recessed from a surrounding thereof and configured to accommodate therein the connection part, in a vicinity of a boundary part between the ring part and the spoke part, an outer surface of the accommodation concave portion is covered by a surface-side material arranged on a surface-side of the steering wheel and composed of a constitutional component for the steering wheel arranged in a vicinity of the cover layer or spoke part, at least one of the spoke parts includes a protruding portion protruding upwardly at a root side of the spoke, and the accommodation concave portion corresponds to a notch in an upper surface of the protruding portion and at an inner side in a left-right direction of the protrusion, and the covering layer comprises a center-side layer having a ring-side part configured to cover an outer-periphery side of the ring part, and a spoke-side part configured to cover a core of the spoke part and to define the accommodation concave portion at a position corresponding to the notch.

6. The steering wheel according to claim 5, wherein the notch is located at a rear end of the protruding portion.

7. The steering wheel according to claim 5, wherein the core and covering layer are formed with the accommodation concave portion recessed from the surrounding thereof and configured to accommodate therein the connection part, in a vicinity of a boundary part between the ring part and the spoke part.

8. The steering wheel according to claim 5, wherein the notch in the upper surface of the protruding portion further defines the accommodation concave portion.

* * * * *